US012561971B2

(12) United States Patent
Young et al.

(10) Patent No.: US 12,561,971 B2
(45) Date of Patent: Feb. 24, 2026

(54) PROCESSING AQUATIC LIFE IMAGES

(71) Applicant: TidalX AI Inc, San Ramon, CA (US)

(72) Inventors: Grace Calvert Young, Mountain View, CA (US); Yangli Hector Yee, San Francisco, CA (US); Julia Black Ling, Menlo Park, CA (US); Cory Drew Schillaci, Berkeley, CA (US)

(73) Assignee: TidalX AI Inc., Mountain View, CA (US)

( * ) Notice: Subject to any disclaimer, the term of this patent is extended or adjusted under 35 U.S.C. 154(b) by 326 days.

(21) Appl. No.: 18/136,184

(22) Filed: Apr. 18, 2023

(65) Prior Publication Data

US 2024/0355116 A1 Oct. 24, 2024

(51) Int. Cl.
*G06V 20/05* (2022.01)
*G06V 10/25* (2022.01)
(Continued)

(52) U.S. Cl.
CPC .............. *G06V 20/05* (2022.01); *G06V 10/25* (2022.01); *G06V 10/764* (2022.01); *G06V 20/70* (2022.01); *G06V 2201/07* (2022.01)

(58) Field of Classification Search
CPC ...... G06V 20/05; G06V 10/25; G06V 10/764; G06V 20/70; G06V 2201/07
See application file for complete search history.

(56) References Cited

U.S. PATENT DOCUMENTS 11,113,574 B1 * 9/2021 Ryu ........................ G06F 18/24
2019/0228218 A1 7/2019 James et al.
(Continued)

FOREIGN PATENT DOCUMENTS

CN 115797844 3/2023
EP 4008179 6/2022
(Continued)

OTHER PUBLICATIONS

Divyabarathi et al., "Object Classification in Underwater SONAR Images using Transfer Learning Based Ensemble Model," 2021 10th International Conference on Advances in Computing and Communications, Oct. 21, 2021, 4 pages.
(Continued)

*Primary Examiner* — Casey L Kretzer
(74) *Attorney, Agent, or Firm* — Fish & Richardson P.C.

(57) ABSTRACT

Methods, systems, and apparatus, including computer programs encoded on a computer storage medium, for processing aquatic life data, e.g., aquatic life images. One of the methods includes obtaining aquatic life data; identifying a first subset of the aquatic life data that is to be annotated by one or more data annotators to generate annotated aquatic life data and a second subset of the aquatic life data that is not to be annotated; providing the first subset of the aquatic life data to the one or more data annotators, the one or more data annotators processing the first subset of the aquatic life data to generate the annotated aquatic life data; providing the second subset of the aquatic life data to a data storage curator; and determining whether and, if so, which storage device in one or more storage devices to store the second subset of the aquatic life data.

20 Claims, 8 Drawing Sheets

(51) Int. Cl.
  G06V 10/764 (2022.01)
  G06V 20/70 (2022.01)

(56) References Cited

U.S. PATENT DOCUMENTS

| | | | | | |
|---|---|---|---|---|---|
| 2020/0367475 | A1* | 11/2020 | Howe | .................... | G06V 20/05 |
| 2021/0142052 | A1 | 5/2021 | James et al. | | |
| 2023/0137533 | A1* | 5/2023 | Yang | .................... | G06V 10/774 |

FOREIGN PATENT DOCUMENTS

| | | |
|---|---|---|
| WO | WO 2022/235352 | 11/2022 |
| WO | WO 2023/003648 | 1/2023 |

OTHER PUBLICATIONS

International Search Report and Written Opinion in International Appln. No. PCT/US2024/021597, dated Jun. 5, 2024, 16 pages.

Cceansofbiodiversity.auckland.ac.nz [online], "AI is a promising new tool for monitoring marine biodiversity," Jun. 22, 2020, retrieved on Dec. 7, 2023, retrieved from URL<https://www.oceansofbiodiversity.auckland.ac.nz/2020/06/22/ai-is-a-promising-new-tool-for-monitoring-marine-biodiversity/>, 5 pages.

Charles Frye [online], "Version Control Data and Models with W&B Artifacts," Weights & Biases, Nov. 19, 2020, retrieved on Oct. 17, 2023, <https://www.youtube.com/watch?v=Hd94gatGMic&list=PLD80i8An1OEGajeVo15ohAQYF1Ttle01k>, [Video Submission].

h2o.ai/wiki/artifacts [online], "Artifacts," Aug. 2022, retrieved on Oct. 17, 2023, retrieved from URL<https://h2o.ai/wiki/artifacts/#:~:text=An%20artifact%20is%20a%20machine,used%20in%20an%20AI%20Tool./>, 3 pages.

wikipedia.org [online], "Reed-Solomon error correction," last edited Dec. 4, 2023, retrieved on Dec. 7, 2023, retrieved from URL<https://en.wikipedia.org/wiki/Reed%E2%80%93Solomon_error_correction#Data_storage/>, 28 pages.

* cited by examiner

200

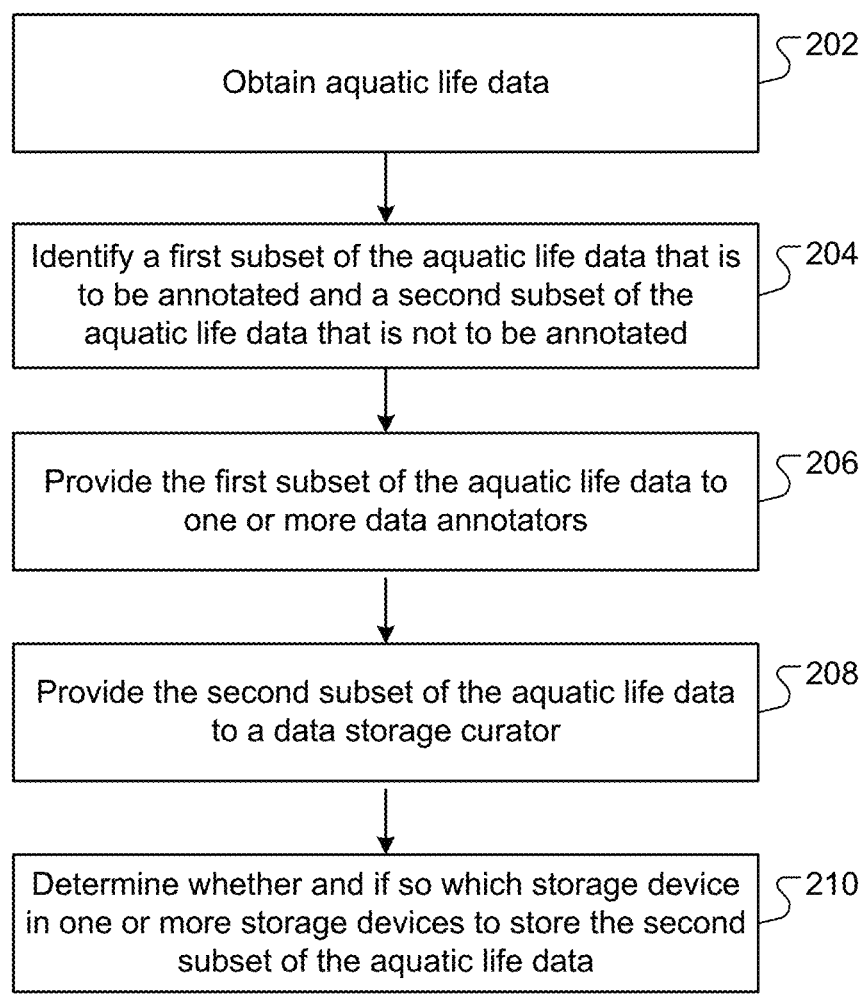

| |
|---|
| Obtain aquatic life data    ⌐202 |

↓

| |
|---|
| Identify a first subset of the aquatic life data that is to be annotated and a second subset of the aquatic life data that is not to be annotated   ⌐204 |

↓

| |
|---|
| Provide the first subset of the aquatic life data to one or more data annotators   ⌐206 |

↓

| |
|---|
| Provide the second subset of the aquatic life data to a data storage curator   ⌐208 |

↓

| |
|---|
| Determine whether and if so which storage device in one or more storage devices to store the second subset of the aquatic life data   ⌐210 |

Process the aquatic life data to generate a data annotation curator output　　402

Identify a data annotator from among the one or more data annotators　　404

Providing at least some of the aquatic life data to the identified data annotator　　406

500

┌─────────────────────────────────────────────────┐
│ Receive aquatic life data comprising a plurality of │ ⌐502
│ aquatic life images from a user                     │
└─────────────────────────────────────────────────┘
                        │
                        ▼
┌─────────────────────────────────────────────────┐
│ Receive a first user request to use the aquatic life data │ ⌐504
│ to train a machine learning model                   │
└─────────────────────────────────────────────────┘
                        │
                        ▼
┌─────────────────────────────────────────────────┐
│ Determine determining a data curator score for each │ ⌐506
│ aquatic life image                                  │
└─────────────────────────────────────────────────┘
                        │
                        ▼
┌─────────────────────────────────────────────────┐
│ Identify, based on the data curator scores, a proper │ ⌐508
│ subset of the plurality of aquatic life images      │
└─────────────────────────────────────────────────┘
                        │
                        ▼
┌─────────────────────────────────────────────────┐
│ Provide the proper subset of the plurality of aquatic life │ ⌐510
│ images to one or more data annotators               │
└─────────────────────────────────────────────────┘
                        │
                        ▼
┌─────────────────────────────────────────────────┐
│ Receive annotation data generated by the one or more │ ⌐512
│ data annotators                                     │
└─────────────────────────────────────────────────┘
                        │
                        ▼
┌─────────────────────────────────────────────────┐
│ Provide the annotation data to a training system    │ ⌐514
│ configured to train the machine learning model      │
└─────────────────────────────────────────────────┘

Receive a second user request to identify aquatic life images similar to a target aquatic life image ⟍702

Determine a similarity score for each aquatic life image ⟍704

Identify one or more aquatic life images that satisfy a similarity score threshold ⟍706

Provide the one or more aquatic life images that satisfy a similarity score threshold to the user ⟍708

PROCESSING AQUATIC LIFE IMAGES

BACKGROUND

This specification relates to processing images using a machine learning model. For example, the images can include images of aquatic life, such as fish, crustaceans, or aquatic plants.

Machine learning models receive an input and generate an output, e.g., a predicted output, based on the received input. Some machine learning models are parametric models and generate the output based on the received input and on values of the parameters of the model.

SUMMARY

This specification describes an aquatic life data curation system implemented as computer programs on one or more computers in one or more locations that obtains the aquatic life data, e.g., aquatic life image, and takes a number of different actions by using the aquatic life data.

Particular embodiments of the subject matter described in this specification can be implemented so as to realize one or more of the following advantages. The aquatic life data curation system described in this specification allows users to define various data annotation rules and data storage rules to manage how aquatic life images are labeled, to bypass labeling of the aquatic life images, or to only store the aquatic life images to specific destinations. In addition to the saving in computing resources (e.g., processing resources, memory resources, or both), e.g., by virtue of skipping the labeling of or simply discarding certain images in accordance with these rules, the aquatic life data curation system can also ensure data privacy, e.g., can ensure compliance with data privacy regulations, e.g., General Data Protection Regulation (GDPR) in the European Union.

The system can use the obtained aquatic life images in a way that increases the value of these images for any of a variety of technical applications. For example, when used to fine-tune a pre-trained machine learning model, by applying images selected from the obtained images that show fish having rare species as fine-tuning data can, in turn, improve the performance of fine-tuned neural network with respect to fish that is rarely seen, while consuming fewer computing resources and being faster in terms of wall-clock time than other fine-tuning processes that blindly apply each and every one of the obtained images as the fine-tuning data. As another example, by filtering out noise or otherwise irrelevant images, the content of a large amount of aquatic life images can be more accurately analyzed for their relevance to a downstream task, e.g., a fish disease detection task, which will then be used to prioritize more relevant images for further inspection by developers to shorten the development cycle of the downstream task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for applying a set of data annotation rules to aquatic life data.

FIG. 5 is a flow diagram of an example process for identifying a proper subset of the plurality of aquatic life images to train a machine learning model.

Like reference numbers and designations in the various drawings indicate like elements.

DETAILED DESCRIPTION

Figure 1:
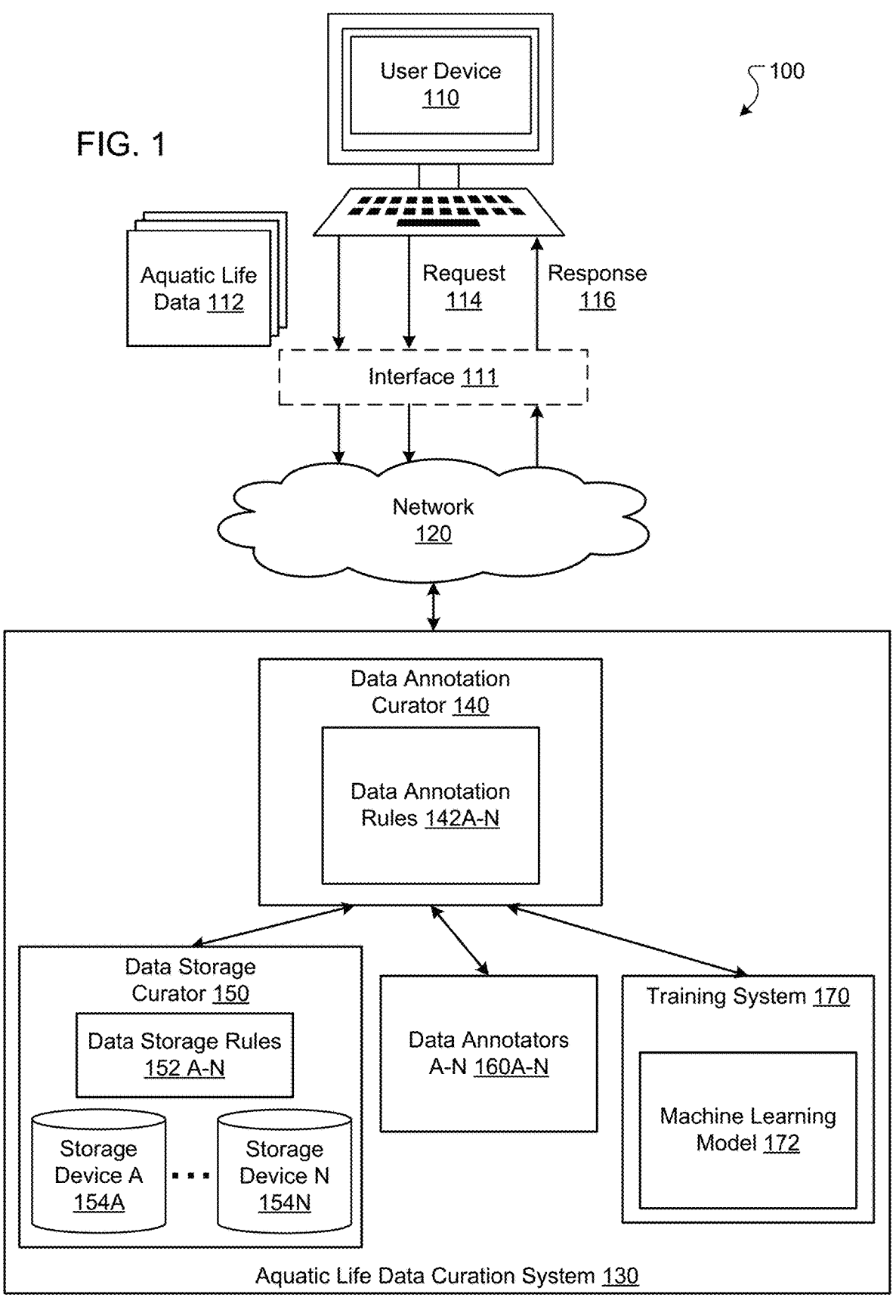
FIG. 1 is an example environment that includes a user device and an aquatic life data curation system.

FIG. 1 is an example environment 100 that includes a user device 110 and an aquatic life data curation system 130. A data communication network 120 connects the user device 110 and the aquatic life data curation system 130. The network 120 can include a local area network (LAN), a wide area network (WAN), the Internet, a mobile network, or a combination thereof.

A user device 110 is an electronic device that is capable of sending aquatic life data 112, requests 114, and other electronic data over the network 120 to the aquatic life data curation system 130 and receiving responses 116 from the aquatic life data curation system 130. The user device 110 includes a display and an input device, e.g., a touchscreen, a touchpad, a keyboard, a mouse, one or more buttons, and/or a pointing device, that provide an interface 111 to a user of the user device. The interface 111 can be an application programming interface (API), a graphical user interface (GUI), or various combinations of the two and possibly another user interface (e.g., a web browser as user interface), through which the user can interact with user device 110 in order to, for example, view/upload aquatic life data 112 and content related to the aquatic life data, submit requests 114, and view responses 116. Example user devices include personal computers, mobile communication devices (e.g., smartphones, tablet computing devices, and/or smart watches), and other computing devices.

The aquatic life data 112 can include any image that may be provided by the user device 110 over the network 120 to the aquatic life data curation system 130. The images can include images of aquatic life, e.g., fish, crustaceans, or aquatic plants.

As used herein, the term "image" can mean a digital image, such as a two-dimensional image or a three-dimensional image, or even consecutive frames of video, e.g., video recordings or video clips. Images may be captured by one or more vision sensors, for example, a camera (e.g., a camera of the user device 110 or another user device), a video camera, a thermal imaging sensor, or an infrared sensor, etc., and stored as digital data, such a compressed image file, RAW data, etc.

The aquatic life data 112 can also include metadata for the images of aquatic life. Metadata for an image may be data that is descriptive of the image. For example, metadata may include a timestamp that specifies a date and a time at which an image was captured. Metadata may also include a location (such as a geo-tag), determined by a global positioning system (GPS) or another satellite navigation system receiver of a device that captured the image, that specifies the geographic location at which an image was captured. Metadata may also include a tag, or name, attached to an image by the person that captured the image. The metadata may be saved under various standard metadata formats, such as exchangeable image file format (EXIF) type metadata, IPTC type metadata, XMP type metadata, or other types of metadata.

The aquatic life data curation system 130 is an example of a system implemented as computer programs on one or more computers in one or more locations in which the systems, components, and techniques described below are implemented. The aquatic life data curation system 130 includes a data annotation curator 140, a data storage curator 150, one or more data annotators 160A-N, and a machine learning training system 170.

At a high level, the aquatic life data curation system 130 is a system that obtains the aquatic life data 112 and takes a number of different actions by using the aquatic life data 112. The aquatic life data curation system 130 can receive the aquatic life data 112 in any of a variety of ways. For example, the system 130 can receive the aquatic life data 112 as an upload from the user device 110 communicatively coupled to the system over the data communication network 120. As another example, the system 130 can receive an input from a user specifying, e.g., using the interface 111 made available by the user device 110, which data that is already maintained by the system 130 or another system accessible by the system 130 should be used as the aquatic life data 112.

The data annotation curator 140 stores a set of data annotation rules 142A-N. The set of data annotation rules 142A-N can be pre-defined, e.g., by a user of the system 130, and updated over time, e.g., as new data, new requests, or both become available. Using the set of data annotation rules 142A-N, the data annotation curator 140 is able to determine which action(s) among the multiple possible actions can be taken on the aquatic life data 112 that has been received by the aquatic life data curation system 130.

The set of data annotation rules include rules that specify whether an image of aquatic life included in the obtained aquatic life data 112 should be annotated (or labeled) by the data annotators A-N 160A-N and, if so, which data annotator among the data annotators A-N 160A-N should be used to generate annotation data for the image of aquatic life. Examples of these data annotation rules as well as how they might be utilized will be described further below.

For the images of aquatic life that, according to the set of data annotation rules 142A-N, should not be annotated, they are provided by the system 130 to the data storage curator 150. The data storage curator 150 stores a set of data storage rules 152A-N, which can be used to determine whether and, if so, which storage device among the multiple storage devices A-N 154A-N should be utilized to store these images. Like the data annotation rules discussed above, the set of data storage rules 152A-N can be pre-defined, e.g., by a user of the system 130, and updated over time, e.g., as new data, new requests, or both become available.

Each storage device provides storage resources that are capable of providing mass storage for the aquatic life data curation system 130. Each storage device can include one or more computer-readable media, e.g., a floppy disk device, a hard disk device, an optical disk device, or a tape device, a flash memory or other similar solid-state memory device, or an array of devices, including devices in a storage area network or other configurations, in one or more locations.

In some implementations, one or more storage abstractions (e.g., key/value store, file system, data store, etc.) may be overlain on the storage resources to allow scalable use of the storage sources for storing the aquatic life data 112 uploaded by the user device 110. In some implementations, the aquatic life data curation system 130 executes an access management service that manages access to the aquatic life data 112 stored on the storage devices. For example, the aquatic life data curation system 130 may encrypt and store the aquatic life data 112 on the storage devices, as well as retrieve and decrypt the aquatic life data 112 from the storage devices. In some implementations, different storage devices A-N 154A-N may have different access levels and/or different security levels with respect to the aquatic life data 112 stored thereon.

In particular, using the set of data storage rules 152A-N, the data storage curator 150 is able to determine whether and, if so, how the images of aquatic life should be stored, e.g., at which storage device(s), based on a wide variety of factors including, e.g., ease of access, data redundancy or encoding type, ownership, licensing and access restrictions, labeling priority and type, and so on.

Put another way, the aquatic life data curation system 130 receives the aquatic life data 112 and then uses the data storage curator 150 to route the aquatic life data 112 to the storage devices A-N 154A-N, such that a given storage device will only store the subset of the aquatic life data 112 that has been routed to the given storage device. Storing aquatic life data 112 in this way provides a number of advantages.

As one example, in accordance with one or more data storage rules defined with reference to the content or the size of the image, the data storage curator 150 is able to balance access speed and storage cost by dividing the aquatic life data 112 to a rapid access portion and a slow access portion. The rapid access portion may be stored in a rapid access storage device, while the slow access portion may be stored in a slow access storage device. Retrieving the slow access portion may take longer than accessing the rapid access portion. For example, the rapid access storage device can be a solid state drive, compared to a slow access storage device which can be a hard disk drive or a tape drive, where tape storage provides slower access but provides for less costly data storage.

As another example, in accordance with one or more data storage rules defined with reference to the importance level of the image, the data storage curator 150 is able to ensure the reliability of the stored aquatic life data 112 and in particular those images that have been determined as important. Rather than storing one copy of an important image on one storage device, the data storage curator 150 may replicate multiple copies of each important image throughout two or more of the storage devices to increase data redundancy and fault tolerance. The data storage curator 150 may also choose between different implementations of Low-Density-Parity Check (LDPC) or Reed Solomon (RS) encoding schemes or other checksums for error correction to enhance protection of the stored data.

Moreover, in this example of data storage rules defined with reference to the importance level of the image, the data storage curator 150 is able to determine how the aquatic life data 112 should be stored in the identified storage device(s), for example the exact number of copies (e.g., more copies for more important images), the resolution (e.g., higher resolutions for more important images), or both of the images included in the aquatic life data 112.

As another example, in accordance with one or more data storage rules defined with reference to the copyright or privacy information associated with the image, the data storage curator 150 is able to limit unauthorized access to such copyrighted or private data. By storing the aquatic life data 112 in only the storage device designated by the user or the storage device that is suitable/legally compliant, the data storage curator 150 ensures compliance with data privacy regulations, such as the Health Insurance Portability and Accountability Act (HIPAA), or General Data Protection Regulation (GDPR). In addition, the data storage curator 150 may further permit reading of data from the storage device for a limited period of time or for a limited number of uses or reads of the storage device. Limiting number of reads or duration of access to data may be advantageous when a copyright holder wishes to limit access to copyrighted data, e.g., to permit the data to be available, e.g., for viewing for a few days and not longer, or for processing by a machine learning model during training for a few times and not more. Limiting the number of reads or duration of access to data may be of utility in various other applications as well, including with respect to data 112 that is confidential, sensitive, or otherwise private to the user that uploaded the data, as can be determined by a respective data storage rule.

For the images of aquatic life that, according to the set of data annotation rules 142A-N, should be annotated, they are provided by the system 130 to a data annotator, e.g., data annotator 160A. Some images included in the aquatic life data 112 may be first annotated and then stored, and the data annotation curator 140 may provide those images first to the data annotators 160A-N for labeling to generate annotated aquatic life data, and then provide the annotated aquatic life data to the data storage curator 150, such that the data storage curator 150 can use the set of data storage rules 152A-N to determine how the annotated aquatic life data should be stored in the storage devices A-N 154A-N.

A data annotator, e.g., data annotator 160A, can generate annotation data for each aquatic life image provided by the data annotation curator 140. Such annotation data, when joined with the images included in the aquatic life data 112 based on which it is generated, will be referred to as the "annotated aquatic life data."

For each image, the annotation data generally includes label(s) or other information that defines what a machine learning model should generate as output based on processing an input that includes the image. For example, the annotation data for an image can be an image classification label that identifies, from a set of object categories, a particular object category to which an object present in the image belongs. For example, the set of object categories can be a set of aquatic life categories that includes juvenile fish, koi fish, salmon, sharks, trout, bass, and so on. As another example, the annotation data for an image can be an object detection label that identifies a corresponding 2D bounding box (or other bounding shape, including 3D bounding box) for each object present in the image. That is, the object detection label for an image can include data defining a plurality of bounding boxes and, for each of the plurality of bounding boxes, a respective label defining that an object belonging to an object category from a set of object categories is present in the region of an environment shown in the bounding box. As yet another example, the annotation data for an image can be a pose detection label that identifies the pose of an object present in the image. Generally, the pose of an object is a combination of the position and orientation of the object in the image. For example, the pose detection label may be a pose vector that includes an estimated location in the image of each of a predetermined number of points of the object, such as body joints of a fish.

Some data annotators may adopt a manual approach, where the annotation data can be generated manually by people who view each image, which has been presented to them by the system, and annotate the objects they see in the images. Some of these data annotators leverage the expertise of experts. For example, to generate classification labels, these experts can include experts in the domain of fisheries, wildlife, or marine that understand how to discern between different fish of the same species, e.g., how to tell two different salmon apart. Others of these data annotators leverage the knowledge of non-experts. Continuing the classification label example, these non-experts can include people that understand how to discern between different fish of the different species, e.g., how to tell salmon and tilapia apart, but may not understand how to discern between different fish of the same species, e.g., how to tell Atlantic salmon and Black Sea salmon apart.

Some data annotators may adopt an automated approach, where the annotation data can be generated with no or minimal human involvement, and thus the images need not be evaluated individually by people in order for the annotation data to be generated. For example, some data annotators may use an automated AI approach to automatically label the data in large volumes, e.g., based on a relatively small amount of labels generated by human experts.

In particular, using the set of data annotation rules 142A-N, the data annotation curator 140 is able to determine whether and, if so, how annotation data should be generated for an image, e.g., by which data annotator and/or at which time, based on a wide variety of factors including, e.g., type and/or content of the image, availability of storage resources of the storage devices, availability of (the processing resources of) the data annotators, user-defined priority, data access restrictions, and so on.

Put another way, the aquatic life data curation system 130 receives the aquatic life data 112 and then uses the data annotation curator 140 to route some or all of the aquatic life data 112 to the data annotators A-N 160A-N, such that a given data annotator will only generate the annotation data for subset of the aquatic life data 112 that has been routed to the given data annotator.

In some cases, in accordance with the set of data annotation rules 142A-N, the aquatic life data curation system 130 can mine the aquatic life data 112 uploaded from the user to identify a set of training images which, once labeled by the data annotator(s) and subsequently be utilized in training a machine learning model, e.g., the machine learning model 172, can increase the value of the data in the training process, e.g., can shorten the time length needed to train the model to converge, or to further improve the accuracy of the model under a fixed time length.

As one example, one data annotation rule can be a confidence rule, which requires images that have uncertainty scores that satisfy, e.g., are greater than, an uncertainty score threshold to be selected as training images, and therefore, should be forwarded to the data annotator(s) for labeling. An uncertainty score of an image may be dependent on, e.g., proportional to, a likelihood that an incorrect output may be generated by the machine learning model from processing the image. Thus, in the case of image classification, images that might be selected as a training image can include those that will likely be misclassified by the machine learning model, e.g., due to a fish having a rare species being present, or due to blurring or poor lighting conditions.

As another example, one data annotation rule can be a rarity (or uniqueness) rule, which requires only images that have rarity (or uniqueness) scores that satisfy a rarity (or uniqueness) score threshold to be selected as training images, and therefore, should be forwarded to the data annotator(s) for labeling. A rarity score of a given image may represent a number of images having a same aquatic life category as the given image, relative to a total number of the images included in the uploaded aquatic life data 112. Thus, in the case of object detection, images that might be selected as training images can include images of fish having rare species, unconventional appearance, or both, that are updated by the user.

In other cases, generating annotation data using the set of data annotation rules 142A-N provides a number of additional advantages. As one example, the data annotation curator 140 is able to balance between the expertise of a smaller group of domain experts and general availability of a larger group of non-experts. For example, because domain experts may not always be immediately available to label new images as they arrive, non-experts who are generally more available may be utilized first to make an attempt at generating annotation data, which will be forwarded to the domain experts later on for further processing for quality control purposes.

As another example, the data annotation curator 140 is able to maximize the expertise of domain experts and reduce waste in the processing, or intellectual, resources of those domain experts when generating the annotation data. For example, the data annotation curator 140 can ensure a krill expert will only need to view and label images of krill and not any of the other images of empty water that are included in the same batch of aquatic life data 112 uploaded by a user.

As another example, the data annotation curator 140 is able to enhance the productivity of domain experts by reducing distraction, and correspondingly speed up the labeling process. For example, the data annotation curator 140 can ensure that a bivalve expert will only be utilized to view and label images of bivalves and not any of the other unrelated images, such as image of sharks, that may be included in the same batch of aquatic life data 112 uploaded by a user.

As another example, by providing a same subset of the aquatic life data 112 to a pool of data annotators A-N 160 A-N, the data annotation curators 140 is able to account for any inconsistencies resulting from errors or viewers' subjectivities, and thus improve the overall quality of the annotation data. For example, misplaced or misclassified labels for an image may be reduced by selecting the labels that have agree in consensus across the pool of data annotators (and dropping those that disagree with the majority in the pool).

A number of actions can be taken by the aquatic life data curation system 130 after the annotation data has been generated. In some cases, the system 130 can output the annotation data as a response 116 to the user that uploaded the aquatic life data 112 based on which the annotation data has been generated. In some cases, the system 130 can store the annotation data in association with the aquatic life data 112 in one or more of the storage devices A-N 154A-N, e.g., in the format of image-label pairs. In some cases, the aquatic life data curation system 130 can use the annotation data to generate multiple training inputs that each include an image and corresponding label(s). For each image, the label(s) can include any of the labels can be generated by the data annotators A-N 160A-N as discussed above, and/or any other suitable labeling data. The system 130 can then provide the multiple training inputs to the machine learning training system 170, so that the machine learning training system 170 can utilize the training inputs in training a machine learning model 172.

The machine learning model 172 can be configured to perform any kind of machine learning task, i.e., to receive any kind of digital data input and to generate any kind of score, classification, regression, or generative output based on the input. The machine learning model 172 is typically a neural network, although other architectures are also possible, e.g., support vector machine, kernel estimation (e.g., k-nearest neighbor), boosting, decision trees (e.g., random forests), and so on.

In some cases, the machine learning model 172 is configured to perform an image processing task, i.e., receive an input image and to process the input image to generate an output for the input image. For example, the task may be image classification and the output generated by the model for a given image may be scores for each of a set of object categories, with each score representing an estimated likelihood that the image contains an image of an object belonging to the category. For example, the set of object categories can include juvenile fish, koi fish, salmon, sharks, trout, bass, and so on. As another example, the task can be image embedding generation and the output generated by the model can be a numeric embedding of the input image. As another example, the task can be object detection and the output generated by the model can identify locations in the input image at which particular types of objects, e.g., fish, crustaceans, or aquatic plants, are depicted. As another example, the task can be image segmentation and the output generated by the model can define for each pixel of the input image which of multiple categories the pixel belongs to. As yet another example, the task can be a pose detection task for estimating the pose of objects in input images. For example, the model can generate as the output a pose vector that includes an estimated location in the image of each of a predetermined number of keypoints of the object, such as body joints of a fish.

In some more specific examples, the machine learning model 172 can be one of the neural network models described in U.S. Patent Publication No. US20190228218A1 and US20210142052A1 (where the output characterizes the aquatic life depicted in the input image). The machine learning model 172 can also be one of the neural network models described in PCT Patent Publication No. WO2022235352A1 and WO2023003648A1 (where the output characterizes other information that may be derived from the input image, e.g., camera positioning or water turbidity information).

During the development of the machine learning model 172, the user device 110 can issue a request 114 for the aquatic life data curation system 130 to provide computing resources for a machine learning workload, e.g., to execute the training for the model or computing an inference using the model. In response to the request, the aquatic life data curation system 130 instantiates a machine learning compute instance as the machine learning training system 170. Instantiating a compute instance, such as a virtual machine, container, or the like, generally includes reserving computing resources of the underlying aquatic life data curation system 130 and making the reserved computing resources available to the user device 110 for performing the machine learning workload requested by the user.

Thus, a developer may utilize the machine learning compute instance hosted by the system 130 with much more computing resources than the user device 110 to execute a machine learning workload during the development of the machine learning model 172, may save a lot of time, be more productive and may allow a better use of the available computing resources.

As an example for illustration, the developer may submit a request 114 for a machine learning workload that includes or otherwise identifies an image of aquatic life, and the system 130 can generate as output data any kind of score, classification, regression, or generative output by virtue of using the machine learning model 172 deployed at, or accessible by, the system 130 to process the image, which can then be provided as the response 116 to the user device 110 which submitted the request 114.

As another example for illustration, the developer may submit a request 114 for a machine learning workload that includes or otherwise identifies training inputs, and the system 100 can train the machine learning model 172 on the training inputs to generate output data specifying a trained instance of the model 172 capable of computing a desired prediction for a particular machine learning task. For example, the system 130 can provide the output data specifying the trained model, e.g., the trained values of the parameters of the machine learning model 172 and data specifying the architecture of the machine learning model 172, as response 116 to the user device 110 which submitted the request 114.

In some cases, the aquatic life data curation system 130 can receive a request 114 for image retrieval submitted by the user through the interface 111 and generate a response 116 to the request 114. The request 114 for image retrieval can include or otherwise reference, e.g., by specifying a storage location of, a reference image. The aquatic life data curation system 130 can identify images stored within the storage devices A-N 154A-N that are most similar to the reference image, e.g., image showing fish of the same species, captured within the same water, captured under similar lighting conditions, etc. The system 130 can then provide the identified images as the response 116 to the request 114.

In some cases, the aquatic life data curation system 130 can receive a request 114 for prioritization of a plurality of images for a downstream task submitted by the user through the interface 111 and generate a response 116 to the request 114. For example, the downstream task can be a fish disease detection task, a species identification task, a net inspection task, or a fish tracking task. The development of such a downstream task generally requires viewing and analyzing a large number of images, oftentimes according to a predetermined time schedule, and thus can be very resource or time consuming to do so. The aquatic life data curation system 130 can determine a relevance score for each image that represents a relevance of the image relative to the downstream task and then rank the plurality of images according to the relevance score. The system 130 can then provide the ranking as the response 116 to the request 114, e.g., by displaying some or all of the ranking in the interface 111 (e.g., the 10, 100, or 1000 most relevant images) for presentation to the user. This ranking allows the user to view image that are most relevant to the downstream task, thus providing the user with an additional source of information which can assist them to shorten the development cycle of the downstream task.

FIG. 2 is a flow diagram of an example process 200 for applying a set of data annotation rules to aquatic life data. For convenience, the process 200 will be described as being performed by a system of one or more computers located in one or more locations. For example, a system, e.g., the aquatic life data curation system 130 of FIG. 1, appropriately programmed in accordance with this specification, can perform the process 200.

The system obtains aquatic life data (step 202). The aquatic life data includes images that depict aquatic life and, optionally, metadata associated with the images, such as location or time metadata. For example, the images can be captured by one or more vision sensors that are deployed within a controlled environment for farming aquatic life, e.g., on a stationary or moving surface within a fish pen. As another example, the images can be captured by one or more vision sensors that are deployed within an open water space, e.g., on a maritime drone navigating through the Atlantic Ocean.

The system identifies, from the aquatic life data, a first subset of the aquatic life data that is to be annotated by one or more data annotators to generate annotated aquatic life data and a second subset of the aquatic life data that is not to be annotated (step 204). The first and second subsets of the aquatic life data can be non-overlapping subsets of the images included in the obtained aquatic life data. In other words, the system partitions the aquatic life data into multiple smaller subsets, where each subset of the aquatic life data includes a respective number of images.

Figure 3:
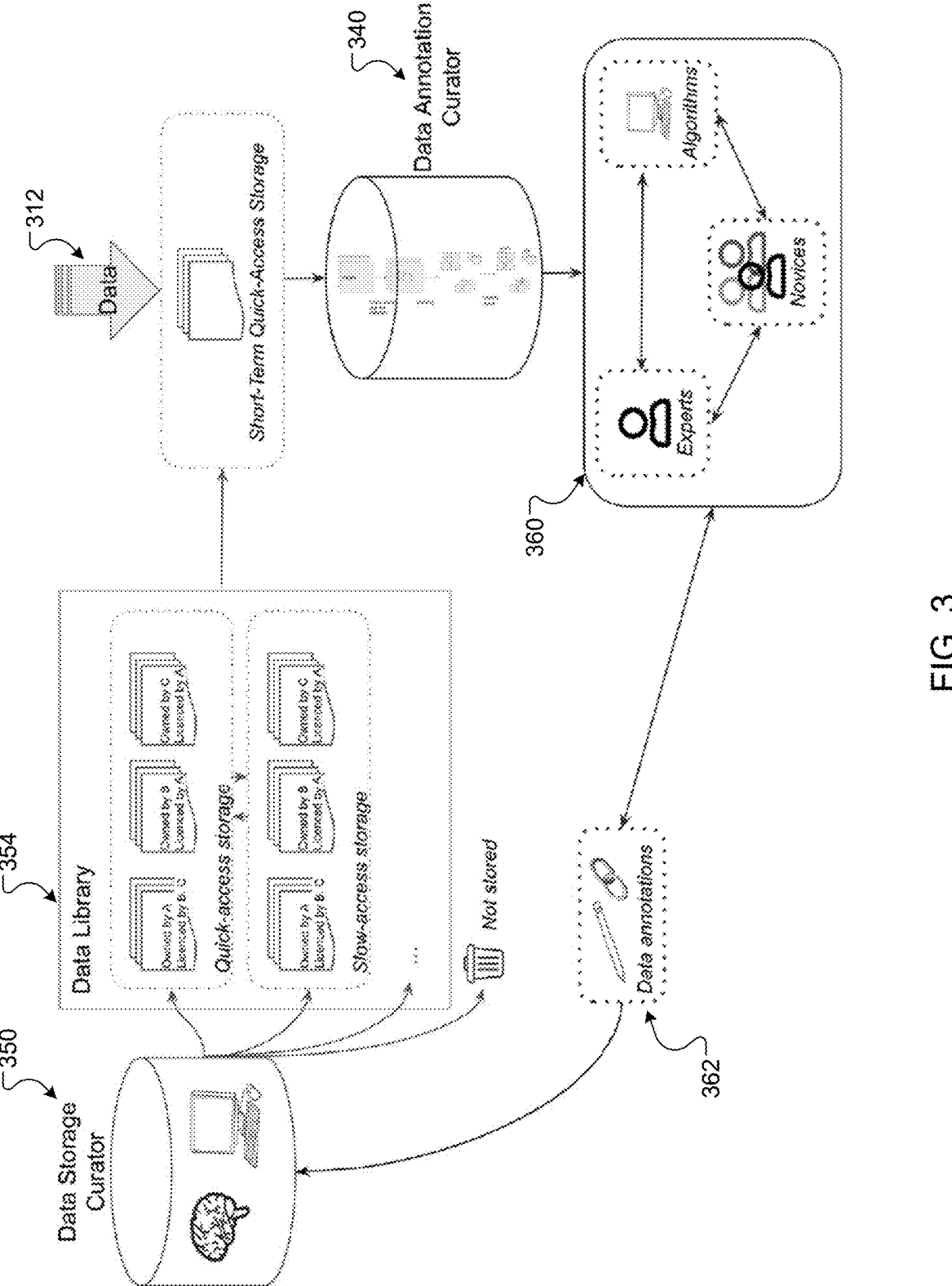
FIG. 3 is an illustration of an example process for applying a set of data annotation rules to aquatic life data.

FIG. 3 is an illustration of an example process for applying a set of data annotation rules to aquatic life data 312. The aquatic life data 312 can be provided by way of a user upload. As illustrated, this identification can be performed by a data annotation curator 340 that stores a set of data annotation rules. In some implementations, the data annotation curator 340 is configured to do so by evaluating each image included in the aquatic life data, data derived from each image included in the aquatic life data (e.g., data included in the data annotation curator outputs generated by the data annotation curator based on the aquatic life data, as will be discussed below with reference to FIG. 4), or both against the set of data annotation rules to determine whether the image should be annotated.

More examples of data annotation rules, in addition to those discussed above with reference to FIG. 1, follow. For example, the set of data annotation rules can include a first data annotation rule specifying that aquatic life data which satisfies an information gain threshold should be annotated (and correspondingly, aquatic life data which does not satisfy the information gain threshold should not be annotated). As used herein, "information gain" may refer to an amount of information gained about an image by observing the label data that could be generated for the image. For example, information gain may be high for an image or sequence of images that contain an unusual species or scenario.

As another example, the set of data annotation rules can include a second data annotation rule specifying that aquatic life data which satisfies an urgency threshold should be annotated. For example, an urgency measure of each image can be explicitly defined by the user which provided the image, or can alternatively be determined by the system, e.g., from the image itself or from the metadata (such as the geo-tag) associated with the image.

As another example, the set of data annotation rules can include a third data annotation rule specifying that aquatic life data which satisfies annotation cost threshold should be annotated. As used herein, "annotation cost" may refer to an amount of processing, memory, and/or network resources required for generating the annotation data for the aquatic life data by one or more data annotators.

The system provides, by the data annotation curator, the first subset of the aquatic life data to the one or more data annotators (step 206). The one or more data annotators will then process the first subset of the aquatic life data to generate annotation data, which can then be joined with the first subset of the aquatic life data to provide the annotated aquatic life data.

In some cases, the system provides the first subset of the aquatic life data to the same data annotator, or to the same pool of data annotators. In other cases, as described further below with reference to FIG. 4, the system provides different portions of the first subset to different data annotators, such that the same image will be labeled by two or more different data annotators to generate respective annotation data for the image that is possibly different from each other.

The system provides, by the data annotation curator, the second subset of the aquatic life data to a data storage curator (step 208). As mentioned above, the second subset of the aquatic life data need not be annotated by the one or more data annotators. Thus, the second subset of the aquatic life data can be routed to the data storage curator after it is obtained and processed by the data annotation curator, without having to pass through the data annotators.

The system determines whether and, if so, which storage device in one or more storage devices to store the second subset of the aquatic life data (step 210). In various implementations, the one or more storage devices can (i) have different levels of access speed, data security, or both, (ii) be in different geographic locations, or both (i) and (ii).

As illustrated in FIG. 3, this determination can be performed by the data storage curator 350 that stores a set of data storage rules. In the example of FIG. 3, the system determine if an image included in the aquatic life data 312 should be stored in a rapid access storage device, e.g., a solid state drive, or alternatively stored in a slow access storage device, e.g., a hard disk drive or a tape drive, or simply discarded.

More examples of data storage rules, in addition to those discussed above with reference to FIG. 1, follow. For example, the set of data storage rules can include data storage rules comprise one or more data compliance rules, with require that the aquatic life data will only be stored at a storage device that is physically located within a geographic location permitted by applicable laws or regulations, e.g., General Data Protection Regulation (GDPR) in the European Union.

As another example, the set of data storage rules can include one or more data ownership rules, which require that the aquatic life data will have to be stored in a storage device, e.g., a storage device that is under operation control of the owner of the data, together with ownership and license information related to the aquatic life data. The ownership/license information may be stored in a manner to ensure that the data is not modified without proper authority. This ownership/license information may travel with the aquatic life data when the aquatic life data is moved from one storage device to another. Also, the accessibility of the aquatic life data in the storage device may change in accordance with the license, e.g., degrade over time as licenses expire.

Figure 4:
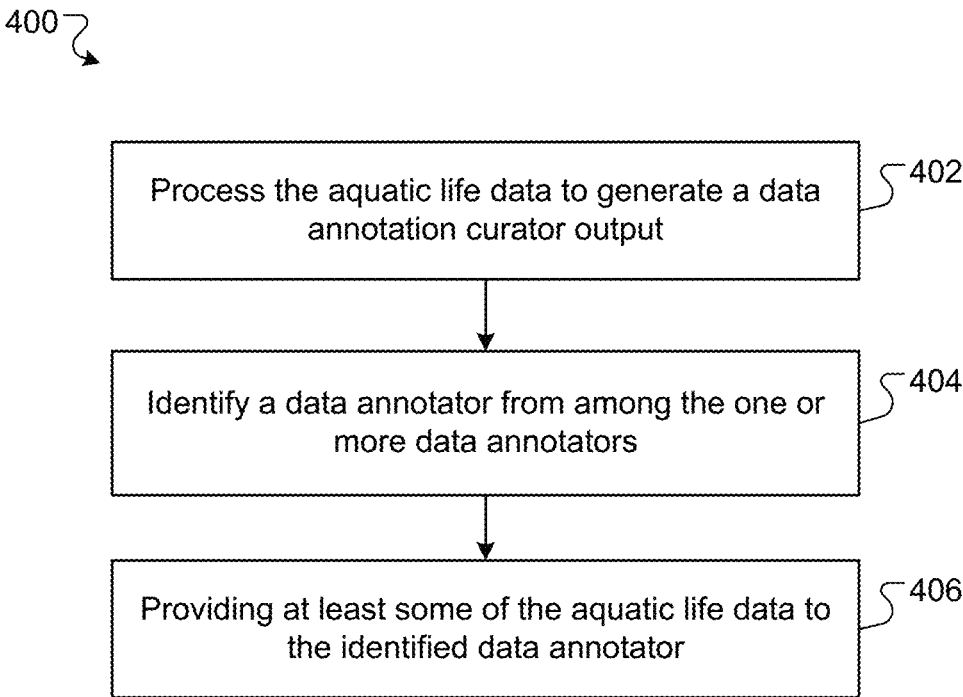
FIG. 4 is a flow diagram of an example process for identifying a data annotator.

FIG. 4 is a flow diagram of an example process 400 for identifying a data annotator. For convenience, the process 400 will be described as being performed by a system of one or more computers located in one or more locations. For example, a system, e.g., the aquatic life data curation system 130 of FIG. 1, appropriately programmed in accordance with this specification, can perform the process 400.

The system processes the aquatic life data using the data annotation curator to generate one or more data annotation curator outputs that characterize the aquatic life data (step 402). The data annotation curator is used to apply a number of processes to the aquatic life data in order to infer or extract additional information that is not explicitly defined in the aquatic life data and that is thus not readily available to the system upon obtaining the aquatic life data. Examples of such information that is included in or is otherwise derivable from the data annotation curator outputs can include: the percentage of images in which fish of a particular species in present, whether an image depicts a fish of a previously unseen or rarely seen species, whether an image depicts any object, such as fish, or depicts just water, and so on.

For example, the data annotation curator can be configured to apply an object detection process or image classification process to the images included in the aquatic life data to generate one or more object detection or image classification outputs. As another example, the data annotation curator can be configured to apply a clustering process to the images included in the aquatic life data, i.e., to merge images that depict fish of a same species is present into a same cluster, to generate one or more clustering outputs. As another example, the data annotation curator can be configured to apply an anomaly detection process, i.e., to identify images that depict objects whose characteristics deviate significantly from the majority of the aquatic life data, to generate one or more anomaly detection outputs. Other data preprocessing or cleansing processes can also be applied.

The system identifies, based on the one or more data annotation curator outputs, a data annotator from among the one or more data annotators (step 404). The one or more data annotators can have varying levels of characteristics including annotation accuracy, throughput, capability, or a combination thereof, relative to one another. For each image (or a batch of images), the set of data annotation rules, which can be defined with reference to these data annotator characteristics, are used to select the data annotator for labeling the image (or the batch of images).

In the example of FIG. 3, there are three data annotators 360: an expert data annotator ("Experts"), a non-expert data annotator ("Novices"), and an automated data annotator ("Algorithms"). An expert data annotator typically provides the highest level annotation accuracy due to their expertise. However, the expert data annotator may not have immediate availability or necessary efficiency to label all of the new images. A non-expert data annotator generally has greater availability than the expert data annotator, but may lack the knowledge required to label certain new images.

Depending on the actual data annotation curator outputs, a different one of these three data annotators may be selected from time to time for labeling the aquatic life data. For example, if the data annotation curator outputs indicate that the aquatic life data 312 contains a large number of images in which no object is present (and rather just depict water), the system may then select the non-expert data annotator.

The system provides at least some of the aquatic life data to the identified data annotator (step 406). Continuing the example above, the system may provide either (i) those images that have been indicated by the data annotation curator outputs as depicting just water or (ii) all of the images included in the aquatic life data 312 to the selected non-expert data annotator for labeling the aquatic life data 312.

FIG. 5 is a flow diagram of an example process 500 for identifying a proper subset of the plurality of aquatic life images to train a machine learning model. For convenience, the process 500 will be described as being performed by a system of one or more computers located in one or more locations. For example, a system, e.g., the aquatic life data curation system 130 of FIG. 1, appropriately programmed in accordance with this specification, can perform the process 500.

The system receives aquatic life data comprising a plurality of aquatic life images from a user through a user interface (step 502). For example, the user interface can be the interface 111 provided by the user device 110 of FIG. 1, which is connected to the aquatic life data curation system 130 over the data communication network 120.

The system receives, within the user interface, a first user request to use the aquatic life data to train a machine learning model (step 504). For example, the user who uploaded the plurality of aquatic life images can submit this first user request to use these images to train a classification model that is configured to process an aquatic life image to classify the aquatic life image into one of multiple aquatic life categories.

In response, the system determines a data curator score for each aquatic life image included in the aquatic life data (step 506). The system can do this by using the data annotation curator to apply any number of different processes that can provide insights into the value of the images in terms of training the machine learning model. Some such example processes include object detection, clustering, and auto labeling of the plurality of aquatic life images, all of which can be performed with no or minimal human intervention.

Figure 6:
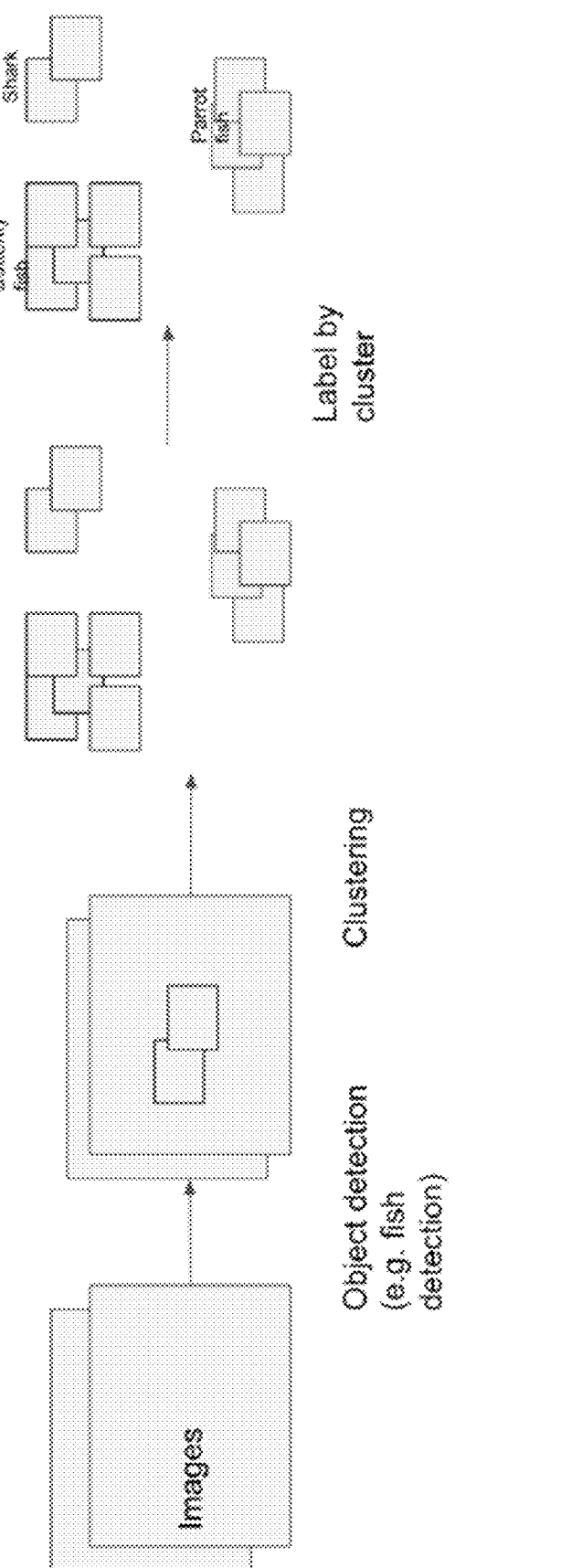
FIG. 6 is an illustration of an example process for determining a data curator score for an aquatic life image.

FIG. 6 is an illustration of an example process for determining a data curator score for an aquatic life image. As illustrated, the system applies a sequence of processes that include an object detection process, followed by a clustering process, followed by a cluster labeling process. In the example of FIG. 6, the object detection process produces bounding box data that defines various regions in the aquatic life images within which fish is likely shown. The bounding box data is then used in the clustering process to produce multiple image clusters, e.g., where each cluster include aquatic life images that show fish having similar characteristics. The cluster labeling process analyzes the contents of the aquatic life images in each cluster to find a label, e.g., butterfly fish, shark, or parrot fish, that best describes the cluster and helps distinguish the clusters from each other.

The data curator score for each aquatic life image can then be computed from the labels. For example, the data curator score for each aquatic life image can be an uncertainty score that is dependent on a likelihood that the aquatic life image will be misclassified by the machine learning model. In this example, different clusters can be given different scores, such that images within a given cluster will have the score that is associated with the given cluster.

As another example, the data curator score for each aquatic life image can be a rarity score that represents a number of aquatic life images having a same aquatic life category as the aquatic life image relative to a total number of the plurality of aquatic life images. In this example, images within the cluster that has a smaller size among all clusters, i.e., includes a smaller number of images compared to other clusters, will logically be given a higher score than those images with the cluster that has a larger size.

More generally, when a sequence of different processes (either include or are different from those mentioned in FIG. 6) are applied by using the data annotation curator, an individual score can be given to an image after each of one or more of the sequence of processes, and combining, e.g., adding, the individual scores for the image gives the cumulative data curator score for the image.

The system identifies, based on the data curator scores, a proper subset of the plurality of aquatic life images (step 508). For example, the aquatic life images having data curator scores that are greater than a threshold data curator score can be selected. As another example, the aquatic life images that have the highest data curator scores among all aquatic life images included in the aquatic life data can be selected.

The system provides the proper subset of the plurality of aquatic life images to one or more data annotators (step 510). In some cases, the system provides the proper subset of the aquatic life data to the same data annotator, or to the same pool of data annotators. In other cases, the system provides different portions of the proper subset to different data annotators, such that the same image will be labeled by two or more different data annotators to generate respective annotation data for the image that is possibly different from each other. In either cases, only the selected proper subset, and rather than all of the plurality of aquatic life images included in the aquatic life data that has been received by the system at step 502, will be provided to the one or more data annotators.

The system receives annotation data generated by the one or more data annotators for the proper subset of the plurality of aquatic life images (step 512). Continuing the above example of classification model, the annotation data for an image can be an image classification label that identifies, from a set of object categories, a particular object category to which an object present in the image belongs. For example, the set of object categories can be a set of aquatic life categories that includes juvenile fish, koi fish, salmon, sharks, trout, bass, and so on.

The system provides the annotation data to a training system configured to train the machine learning model by using the annotation data and the proper subset of the plurality of aquatic life images to update parameter values of the machine learning model (step 514). In some implementations, the training system, the training system 170 of FIG. 1, can repeatedly select training inputs from a set of training data generated from the annotation data as part of a machine learning training technique to train the machine learning model, e.g., a gradient descent with backpropagation training technique that uses, e.g., a stochastic gradient descent, RMSprop, or Adam optimizer, to optimize an objective function that is appropriate for the task that the machine learning model is configured to perform, e.g., to optimize a cross-entropy loss for a classification task.

Figure 7:
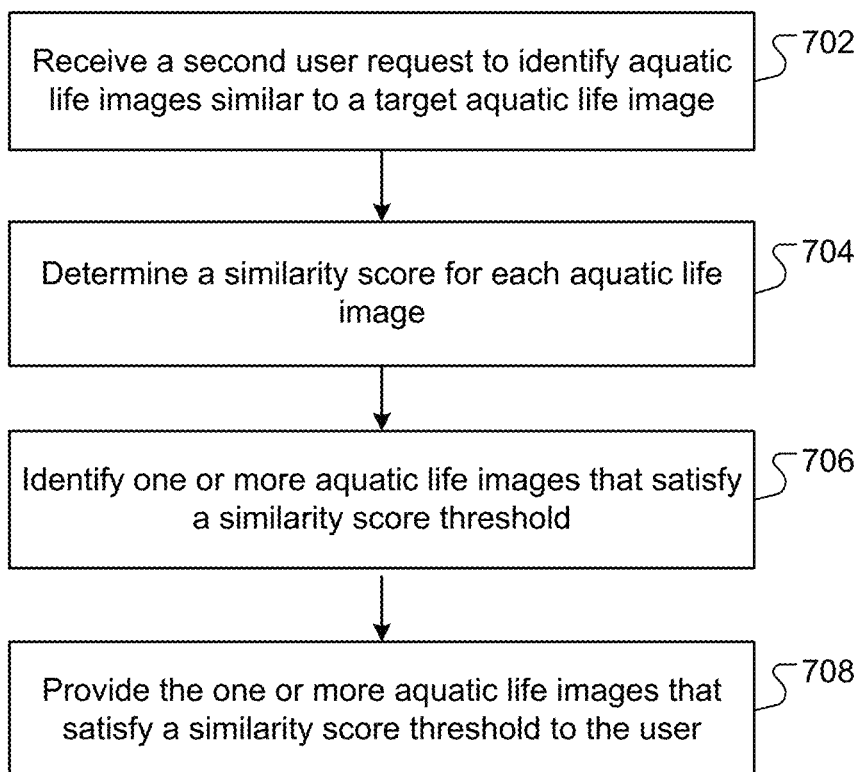
FIG. 7 is a flow diagram of an example process for providing identified aquatic life images to a user.

FIG. 7 is a flow diagram of an example process 700 for providing identified aquatic life images to a user. For convenience, the process 700 will be described as being performed by a system of one or more computers located in one or more locations. For example, a system, e.g., the aquatic life data curation system 130 of FIG. 1, appropriately programmed in accordance with this specification, can perform the process 700.

The system receives, within the user interface, a second user request to identify aquatic life images similar to a target aquatic life image (step 702). For example, the user interface can be the interface 111 provided by the user device 110 of FIG. 1, which is connected to the aquatic life data curation system 130 over the data communication network 120. The second user request can include or otherwise specify, e.g., by identifying a storage location of the target aquatic life image.

The system determines a similarity score for each aquatic life image stored in the one or more storage devices of the system (step 704). For each aquatic life image, the similarity score represents a similarity of the image relative to the target aquatic life image. The system can do this by using any of a number of different approaches. For example, the system can map the target aquatic life image and the stored aquatic life images to respective embeddings in a latent space, e.g., by using a pre-trained convolutional encoder neural network, and then compute the similarity scores based on the distance in the latent space between the target aquatic life image and the embedding of each aquatic life image. Such distances can be computed, e.g., with cosine similarity, dot products, or the like.

As another example, the system can use the associated metadata to compute the similarity scores. For example, the stored aquatic life images that are captured at the same or nearby geographical locations as the target aquatic life image can be given higher similarity scores than those that are captured at distant locations. Likewise, the stored aquatic life images that are captured around the same time frame as the target aquatic life image can be given higher similarity scores than those that are captured at various time points outside of that time frame.

The system identifies one or more aquatic life images that satisfy a similarity score threshold (step 706). For example, the aquatic life images having similarity scores that are greater than a threshold similarity score can be selected. As another example, the aquatic life images that have the highest similarity scores among all stored aquatic life images can be selected.

The system provides, through the user interface, the one or more aquatic life images that satisfy a similarity score threshold to the user (step 708). For example, the system can display the identified aquatic life images, e.g., one after another in the order of their corresponding similarity scores, in the interface through which the user submitted the second user request.

Figure 8:
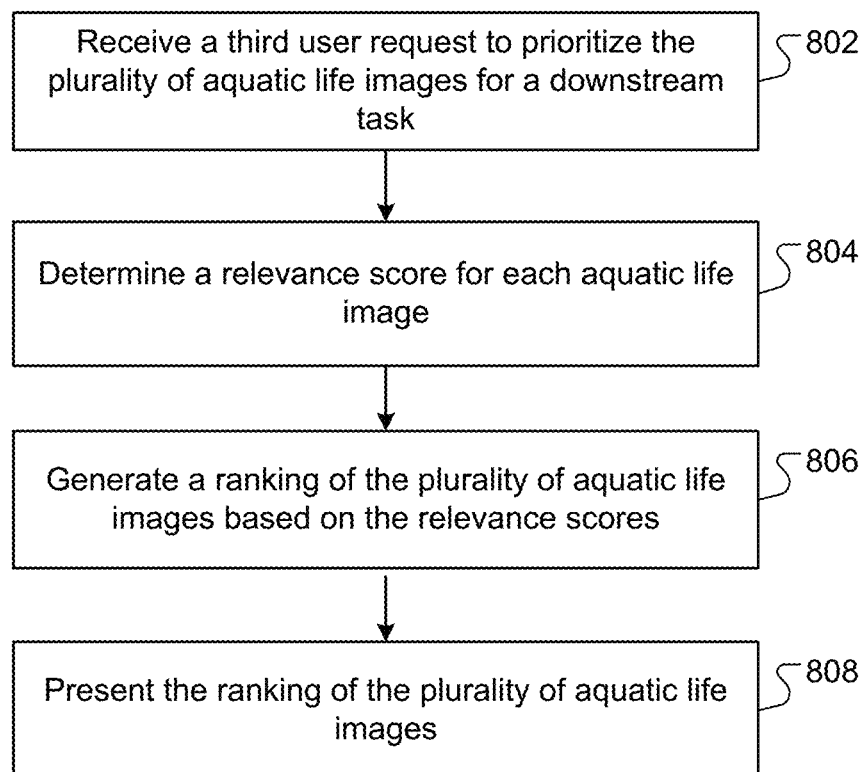
FIG. 8 is a flow diagram of an example process for presenting a ranking of aquatic life images to a user.

FIG. 8 is a flow diagram of an example process 800 for presenting a ranking of aquatic life images to a user. For convenience, the process 800 will be described as being performed by a system of one or more computers located in one or more locations. For example, a system, e.g., the aquatic life data curation system 130 of FIG. 1, appropriately programmed in accordance with this specification, can perform the process 800.

The system receives, within the user interface, a third user request to prioritize the plurality of aquatic life images for a downstream task (step 802). For example, the user interface can be the interface 111 provided by the user device 110 of FIG. 1, which is connected to the aquatic life data curation system 130 over the data communication network 120. For example, the downstream task can be a fish disease detection task, a species identification task, a net inspection task, or a fish tracking task.

The system determines a relevance score for each aquatic life image included in the aquatic life data (step 804). For each aquatic life image, the relevance score represents a relevance of the aquatic life image relative to the downstream task. The system can do this by using any of a number of different approaches. For example, if the downstream task were a fish disease detection task, a species identification task, or a fish tracking task, then aquatic life images that each depict a fish, e.g., determined by way of applying image classification processes, will logically be given higher relevance scores than those that do not depict any fish, e.g., depict just water. As another example, if the downstream task were a net inspection task, then the aquatic life images that have been captured more recently, i.e., according to their associated metadata, will logically be given higher relevance scores than those that are more obsolete.

The system generates a ranking of the plurality of aquatic life images based on the relevance scores (step 806). That is, the system ranks the aquatic life images in order of the relevance scores.

The system presents, within the user interface, the ranking of the plurality of aquatic life images (step 808). For example, the system can display the ranking of the aquatic life images in the interface through which the user submitted the third user request, where the ranking is displayed in the format of a prioritized list of images that need manual review with respect to the downstream task, e.g., with the image that has the highest relevance score at the top of the list.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is an aquatic life data curation system comprising a plurality of computers and a plurality of storage devices storing instructions that are operable, when executed by the computers, to cause the computers to perform operations comprising:

obtaining aquatic life data;

identifying, from the aquatic life data, by a data annotation curator and in accordance with a set of data annotation rules, a first subset of the aquatic life data that is to be annotated by one or more data annotators to generate annotated aquatic life data and a second subset of the aquatic life data that is not to be annotated;

providing, by the data annotation curator, the first subset of the aquatic life data to the one or more data annotators, the one or more data annotators processing the first subset of the aquatic life data to generate the annotated aquatic life data;

providing, by the data annotation curator, the second subset of the aquatic life data to a data storage curator; and determining, by the data storage curator and in accordance with a set of data storage rules, whether and, if so, which storage device in one or more storage devices to store the second subset of the aquatic life data.

Embodiment 2 is the aquatic life data curation system of embodiment 1, wherein the aquatic life data comprises images that depict aquatic life captured by one or more vision sensors comprising a camera, a video camera, a thermal imaging sensor, or an infrared sensor.

Embodiment 3 is the aquatic life data curation system of embodiment 2, wherein the aquatic life data comprises location or time metadata associated with the images.

Embodiment 4 is the aquatic life data curation system of any one of embodiments 1-3, wherein identifying the first subset of the aquatic life data that should be annotated by the one or more data annotators to generate the annotated aquatic life data comprises:

processing the aquatic life data to generate one or more data annotation curator outputs that characterize the aquatic life data;

identifying, based on the one or more data annotation curator outputs, a data annotator from among the one or more data annotators that have varying levels of annotation accuracy, throughput, capability, or a combination thereof; and providing at least some of the aquatic life data to the identified data annotator.

Embodiment 5 is the aquatic life data curation system of embodiment 4, wherein the data annotation curator outputs comprise one or more of: an image classification output, a video classification output, an object detection output, a clustering output, or an anomaly detection output.

Embodiment 6 is the aquatic life data curation system of any one of embodiments 1-5, wherein the annotated aquatic life data comprises:

data defining a plurality of bounding boxes in an aquatic life image; and for each of the plurality of bounding boxes, a respective label defining that aquatic life belonging to an aquatic life category from a set of aquatic life categories is present in the region of an environment shown in the bounding box.

Embodiment 7 is the aquatic life data curation system of any one of embodiments 1-6, wherein the set of data annotation rules comprise:

a first data annotation rule specifying that aquatic life data which satisfies an information gain threshold should be annotated, a second data annotation rule specifying that aquatic life data which satisfies an urgency threshold should be annotated, or both the first and second data annotation rules.

Embodiment 8 is the aquatic life data curation system of any one of embodiments 1-7, wherein determining whether and if so which storage device in the one or more storage devices to store the second subset of the aquatic life data comprises:

identifying, based on the second subset of the aquatic life data, a storage device from among the one or more storage devices that (i) have varying levels of access speed, data security, or both, (ii) are in different geographic locations, or both (i) and (ii).

Embodiment 9 is the aquatic life data curation system of embodiment 8, wherein the operations further comprise:

determining how the second subset of the aquatic life data should be stored in the identified storage device, comprising determining a number of copies, a resolution, or both of the second subset of the aquatic life data that should be stored.

Embodiment 10 is the aquatic life data curation system of any one of embodiments 1-10, wherein the operations further comprise:

applying data stored in the one or more storage devices as training data to train a machine learning model to process a model input that comprises an image depicting aquatic life and to generate a model output that characterizes the aquatic life depicted in the image.

Embodiment 11 is the aquatic life data curation system of any one of embodiments 1-10, wherein the set of data storage rules comprise one or more data compliance rules.

Embodiment 12 is one or more computer-readable storage media storing instructions that when executed by one or more computers cause the one or more computers to perform the respective operations performed by the aquatic life data curation system of any preceding embodiment.

Embodiment 13 is a method comprising respective operations of performed by the aquatic life data curation system of any preceding embodiment.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. An aquatic life data curation system comprising a plurality of computers and a plurality of storage devices storing instructions that are operable, when executed by the computers, to cause the computers to perform operations comprising:

obtaining aquatic life data;

identifying, from the aquatic life data, by a data annotation curator and in accordance with a set of data annotation rules, a first subset of the aquatic life data that is to be annotated by one or more data annotators to generate annotated aquatic life data and a second subset of the aquatic life data that is not to be annotated;

providing, by the data annotation curator, the first subset of the aquatic life data to the one or more data annotators, the one or more data annotators processing the first subset of the aquatic life data to generate the annotated aquatic life data;

providing, by the data annotation curator, the second subset of the aquatic life data to a data storage curator; and determining, by the data storage curator and in accordance with a set of data storage rules, whether to store the second subset of the aquatic life data and, if so, which storage device in one or more storage devices to store the second subset of the aquatic life data.

2. The aquatic life data curation system of claim 1, wherein the aquatic life data comprises images that depict aquatic life captured by one or more vision sensors comprising a camera, a video camera, a thermal imaging sensor, or an infrared sensor.

3. The aquatic life data curation system of claim 2, wherein the aquatic life data comprises location or time metadata associated with the images.

4. The aquatic life data curation system of claim 1, wherein identifying the first subset of the aquatic life data that should be annotated by the one or more data annotators to generate the annotated aquatic life data comprises:

processing the aquatic life data to generate one or more data annotation curator outputs that characterize the aquatic life data;

identifying, based on the one or more data annotation curator outputs, a data annotator from among the one or more data annotators that have varying levels of annotation accuracy, throughput, capability, or a combination thereof; and providing at least some of the aquatic life data to the identified data annotator.

5. The aquatic life data curation system of claim 4, wherein the data annotation curator outputs comprise one or more of: an image classification output, a video classification output, an object detection output, a clustering output, or an anomaly detection output.

6. The aquatic life data curation system of claim 1, wherein the annotated aquatic life data comprises:

data defining a plurality of bounding boxes in an aquatic life image; and for each of the plurality of bounding boxes, a respective label defining that aquatic life belonging to an aquatic life category from a set of aquatic life categories is present in the region of an environment shown in the bounding box.

7. The aquatic life data curation system of claim 1, wherein the set of data annotation rules comprise:

a first data annotation rule specifying that aquatic life data which satisfies an information gain threshold should be annotated, a second data annotation rule specifying that aquatic life data which satisfies an urgency threshold should be annotated, or both the first and second data annotation rules.

8. The aquatic life data curation system of claim 1, wherein determining whether and if so which storage device in the one or more storage devices to store the second subset of the aquatic life data comprises:

identifying, based on the second subset of the aquatic life data, a storage device from among the one or more storage devices that (i) have varying levels of access speed, data security, or both, (ii) are in different geographic locations, or both (i) and (ii).

9. The aquatic life data curation system of claim 8, wherein the operations further comprise:

determining how the second subset of the aquatic life data should be stored in the identified storage device, comprising determining a number of copies, a resolution, or both of the second subset of the aquatic life data that should be stored.

10. The aquatic life data curation system of claim 1, wherein the operations further comprise:

applying data stored in the one or more storage devices as training data to train a machine learning model to process a model input that comprises an image depicting aquatic life and to generate a model output that characterizes the aquatic life depicted in the image.

11. The aquatic life data curation system of claim 1, wherein the set of data storage rules comprise one or more data compliance rules.

12. One or more non-transitory computer-readable storage media storing instructions that when executed by one or more computers cause the one or more computers to perform operations comprising:

obtaining aquatic life data;

identifying, from the aquatic life data, by a data annotation curator and in accordance with a set of data annotation rules, a first subset of the aquatic life data that is to be annotated by one or more data annotators to generate annotated aquatic life data and a second subset of the aquatic life data that is not to be annotated;

providing, by the data annotation curator, the first subset of the aquatic life data to the one or more data annotators, the one or more data annotators processing the first subset of the aquatic life data to generate the annotated aquatic life data;

providing, by the data annotation curator, the second subset of the aquatic life data to a data storage curator; and determining, by the data storage curator and in accordance with a set of data storage rules, whether to store the second subset of the aquatic life data and, if so, which storage device in one or more storage devices to store the second subset of the aquatic life data.

13. A method performed by an aquatic life data curation system comprising a plurality of computers, wherein the method comprises:

obtaining aquatic life data;

identifying, from the aquatic life data, by a data annotation curator and in accordance with a set of data annotation rules, a first subset of the aquatic life data that is to be annotated by one or more data annotators to generate annotated aquatic life data and a second subset of the aquatic life data that is not to be annotated;

providing, by the data annotation curator, the first subset of the aquatic life data to the one or more data annotators, the one or more data annotators processing the first subset of the aquatic life data to generate the annotated aquatic life data;

providing, by the data annotation curator, the second subset of the aquatic life data to a data storage curator; and determining, by the data storage curator and in accordance with a set of data storage rules, whether to store the second subset of the aquatic life data and, if so, which storage device in one or more storage devices to store the second subset of the aquatic life data.

14. The method of claim 13, wherein the aquatic life data comprises images that depict aquatic life captured by one or more vision sensors comprising a camera, a video camera, a thermal imaging sensor, or an infrared sensor.

15. The method of claim 14, wherein the aquatic life data comprises location or time metadata associated with the images.

16. The method of claim 13, wherein identifying the first subset of the aquatic life data that should be annotated by the one or more data annotators to generate the annotated aquatic life data comprises:

processing the aquatic life data to generate one or more data annotation curator outputs that characterize the aquatic life data;

identifying, based on the one or more data annotation curator outputs, a data annotator from among the one or more data annotators that have varying levels of annotation accuracy, throughput, capability, or a combination thereof; and providing at least some of the aquatic life data to the identified data annotator.

17. The method of claim 16, wherein the data annotation curator outputs comprise one or more of: an image classification output, a video classification output, an object detection output, a clustering output, or an anomaly detection output.

18. The method of claim 13, wherein the annotated aquatic life data comprises:

data defining a plurality of bounding boxes in an aquatic life image; and for each of the plurality of bounding boxes, a respective label defining that aquatic life belonging to an aquatic life category from a set of aquatic life categories is present in the region of an environment shown in the bounding box.

19. The method of claim 13, wherein the set of data annotation rules comprise:

a first data annotation rule specifying that aquatic life data which satisfies an information gain threshold should be annotated, a second data annotation rule specifying that aquatic life data which satisfies an urgency threshold should be annotated, or both the first and second data annotation rules.

20. The method of claim 13, wherein determining whether and if so which storage device in the one or more storage devices to store the second subset of the aquatic life data comprises:

identifying, based on the second subset of the aquatic life data, a storage device from among the one or more storage devices that (i) have varying levels of access speed, data security, or both, (ii) are in different geographic locations, or both (i) and (ii).

* * * * *